(12) United States Patent
Boer et al.

(10) Patent No.: US 8,353,137 B2
(45) Date of Patent: Jan. 15, 2013

(54) COMPRESSION MOUNTED WINDOW ASSEMBLY

(75) Inventors: Jonathan L. Boer, Lakeville, MN (US); Eric L. Lovaasen, Chaska, MN (US); Kevin J. Benning, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 103 days.

(21) Appl. No.: 12/807,349

(22) Filed: Sep. 2, 2010

(65) Prior Publication Data

US 2012/0055103 A1 Mar. 8, 2012

(51) Int. Cl.
*E06B 3/00* (2006.01)

(52) U.S. Cl. .................... 52/204.5; 52/171.1; 52/204.62; 52/208; 244/129.3

(58) Field of Classification Search .................. 52/204.5, 52/204.62, 208, 171.1, 204.55, 745.16; 244/129.1, 244/129.3; 296/146.15, 203, 190.1, 201; 219/203
See application file for complete search history.

(56) References Cited

U.S. PATENT DOCUMENTS

| 4,598,497 | A | | 7/1986 | Di Giusto et al. |
|---|---|---|---|---|
| 4,793,108 | A | * | 12/1988 | Bain et al. ........................ 52/208 |
| 5,902,505 | A | * | 5/1999 | Finley ............................. 219/547 |
| 6,168,112 | B1 | * | 1/2001 | Mueller et al. .............. 244/129.3 |
| 6,736,352 | B2 | * | 5/2004 | Bladt et al. .................. 244/129.3 |
| 6,905,094 | B2 | * | 6/2005 | Dazet et al. ................. 244/129.3 |
| 7,143,979 | B2 | | 12/2006 | Wood et al. |
| 7,661,626 | B2 | * | 2/2010 | Wood .......................... 244/129.3 |
| 2007/0194177 | A1 | * | 8/2007 | Coak .......................... 244/129.3 |
| 2009/0017263 | A1 | | 1/2009 | Yeates |
| 2009/0059502 | A1 | | 3/2009 | Filson et al. |
| 2009/0084900 | A1 | * | 4/2009 | Krahn ......................... 244/129.3 |

\* cited by examiner

*Primary Examiner* — Brian Glessner
*Assistant Examiner* — Adam Barlow
(74) *Attorney, Agent, or Firm* — Edwards Wildman Palmer LLP; Scott D. Wofsy; Joshua L. Jones (57) ABSTRACT

A compression mounted window assembly is disclosed that includes a circular window having opposed front and rear planar surfaces and an outer periphery having forward and rearward chamfered edge surfaces, a compressible gasket circumscribing the outer periphery of the window, a housing with a portal having an annular seat for accommodating the window circumscribed by the gasket, wherein the annular seat has a first chamfered abutment surface corresponding to the forward chamfered edge surface of the window, an annular bezel operatively associated with the housing for compressively retaining the window assembly within the annular seat of the portal, and structure for securing the bezel to the housing, wherein the bezel has a second chamfered abutment surface corresponding to the rearward chamfered edge surface of the window.

20 Claims, 11 Drawing Sheets

COMPRESSION MOUNTED WINDOW ASSEMBLY

BACKGROUND OF THE INVENTION

1. Field of the Invention

The subject invention is directed generally to a window assembly, and more particularly, to a compression mounted window assembly for use in conjunction with a camera mounted on the exterior of an aircraft.

2. Background of the Related Art

Aircraft windows are typically installed by using external fasteners, adhesives or brazing. For example, U.S. Pat. No. 4,793,108 to Bain et al. describes a window assembly for an aircraft cabin that employs a retainer clip assembly for connecting the window to a frame, which is then connected as an assembly to the skin of the aircraft. In another example, U.S. Pat. No. 7,143,979 to Wood et al. describes an aircraft windshield wherein a metal edge is bonded to the windshield and the metal edge is then attached by fasteners to frame members of the aircraft's fuselage.

Prior art aircraft window assemblies that include frames and fasteners, such as those described in Bain et al. and Woods et al., do not present smooth aerodynamic surfaces that are flush with the aircraft fuselage. As a result, these prior art window assemblies can produce unnecessary drag. In addition, an inordinate amount of labor is required to install and replace the windows with supporting fasteners and frames. Furthermore, the fasteners and frames provide a potential leak path for moisture and air.

It would be beneficial to provide a window assembly for an aircraft that can be easily and efficiently installed and replaced without the use of external fasteners, frames, adhesives, brazing or any other process, so as to reduce aerodynamic drag and attendant labor costs. The subject invention satisfies those need by providing a window assembly that is readily mounted in a housing by compression.

SUMMARY OF THE INVENTION

The subject invention is directed to a compression mounted window assembly that includes a circular window having opposed front and rear planar surfaces and an outer periphery having at least one chamfered edge surface, a compressible material circumscribing the outer periphery of the window, a housing having a portal defining an annular seat for accommodating the window circumscribed by the gasket, an annular bezel operatively associated with the housing for compressively mounting the window assembly within the annular seat of the portal, and means for securing the bezel to the housing, wherein at least one of the annular seat and the annular retainer has a chamfered abutment surface that corresponds to the at least one chamfered edge surface of the window. Preferably, the window is configured from clear impact resistant material, such as sapphire, and the compressible material is configured from a silicone based elastomeric, such as a fluorosilicone.

In one embodiment of the subject invention, the chamfered edge surface extends from the front surface of the window and the annular retainer has a corresponding chamfered abutment surface. In another embodiment of the subject invention, the chamfered edge surface extends from the rear surface of the window and the annular seat has a corresponding chamfered abutment surface. In yet another embodiment of the subject invention, the chamfered edge surface extends from the front surface of the window and the annular seat has a corresponding chamfered abutment surface.

Preferably, the outer periphery of the window includes a forward facing chamfered edge surface that extends from the front surface of the window and a rearward facing chamfered edge surface that extends from the rear surface of the window. In this embodiment, the annular seat has a first chamfered abutment surface that corresponds with the forward facing chamfered edge surface and the annular retainer has a second chamfered abutment surface that corresponds with the rearward facing chamfered edge surface. The forward and rearward facing chamfered edge surfaces of the window converge at a peripheral land area and define relative angles. Preferably, the forward and rearward facing chamfered edge surfaces define complementary angles, and more preferably, the complementary angles formed by the forward and rearward facing chamfered edge surfaces are 45° angles.

The compression mounted window assembly further includes means for mating the retainer with the housing. In one instance, the mating means includes a threaded locking ring for securing the retainer with the housing. Alternatively, the mating means includes a plurality of threaded fasteners for securing the retainer with the housing. Preferably, means are operatively associated with the rear surface of the window for heating the window to prevent icing. In one instance, the heating means includes a foil ring applied to the rear surface of the window. Alternatively, the heating means includes a film applied to the rear surface of the window.

The subject invention is also directed to a compression mounted window assembly that includes a circular window having opposed front and rear planar surfaces and an outer periphery having forward and rearward facing chamfered edge surfaces. A compressible gasket circumscribes the outer periphery of the window, and a housing is provided having a portal that defines an annular seat for accommodating the window circumscribed by the gasket. The annular seat has a first chamfered abutment surface corresponding with the forward facing chamfered edge surface of the window, and an annular bezel is operatively associated with the housing for compressively retaining the window assembly within the annular seat of the portal. The bezel has a second chamfered abutment surface corresponding with the rearward facing chamfered edge surface of the window. Preferably, the window assembly further includes a means for securing the bezel to the housing. The securing means can be in the form of a threaded locking ring or a plurality of threaded fasteners.

The subject invention is also directed to a method of compressively mounting a window assembly in a housing having a portal defining an annular seat, wherein the method includes the steps of providing a circular window having front and rear planar surfaces and an outer periphery having forward and rearward facing chamfered edge surfaces, circumscribing the outer periphery of the window with a compressible gasket, seating the window in the portal, and compressively retaining the window in the annular seat of the portal. Preferably, the step of compressively retaining the window in the annular seat includes applying compression in radial and axial directions relative to the front and rear planar surfaces of the window. However, it is envisioned and well within the scope of the subject disclosure that the step of compressively retaining the window in the annular seat could be accomplished by applying compression in a direction parallel to the front and rear surfaces of the window, such as by applying compressive force using a radial clamp.

These and other aspects of the subject invention will become more readily apparent from the following detailed description of the preferred embodiments taken in conjunction with the drawings.

BRIEF DESCRIPTION OF THE DRAWINGS

So that those having ordinary skill in the art to which the subject invention pertains will more readily understand how to make and use the subject invention, preferred embodiments thereof will be described in detail hereinbelow with reference to the drawings, wherein.

DETAILED DESCRIPTION OF THE PREFERRED EMBODIMENTS

Figure 1:
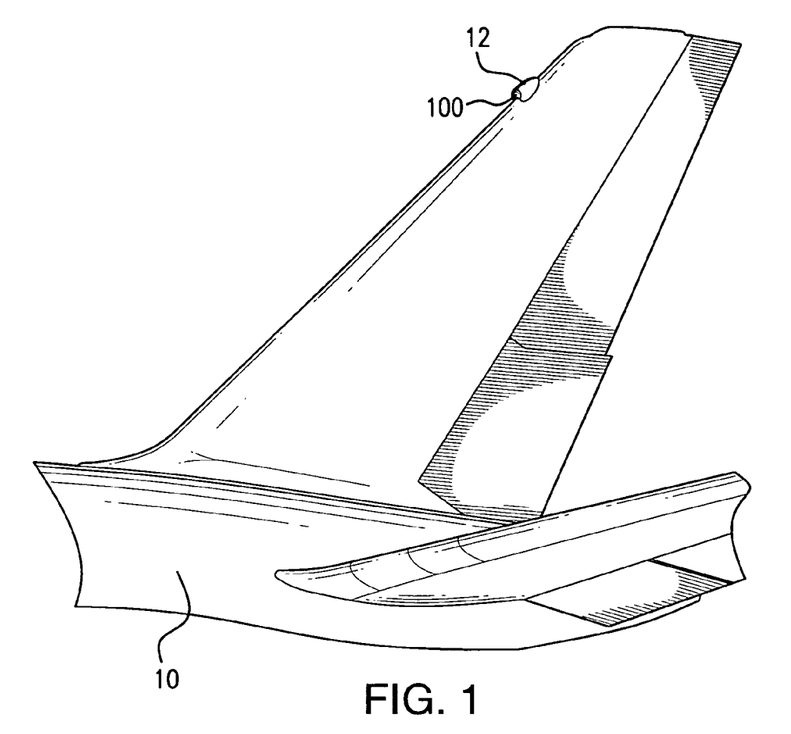
FIG. 1 is a perspective view of the aft end of an aircraft that includes an exterior camera pod containing the compression mounted window assembly of the subject invention.

Referring now to the drawings wherein like reference numerals identify similar structural elements or features of the subject invention, there is illustrated in FIG. 1, the aft or tail section of an aircraft 10 outfitted with an external camera housing 12 that includes the compression mounted window assembly of the subject invention, which is designated generally by reference numeral 100. In this configuration, the external camera 12 is adapted and configured to provide a visual aid to pilots when taxiing at airports in and around the ramps and aprons.

While the subject invention is described and illustrated herein with respect to a camera for use in a particular aerospace application, it should be readily apparent to those having ordinary skill in the art that the compression mounted window assembly of the subject application can be used in other applications as well, where there is a need for a self-centering window assembly that can be mounted in a housing, frame or shroud without the use of any adhesives, brazing or external fasteners. Other applications may include window assemblies for land-based vehicles, watercraft, lighting or electronic devices.

Figure 2:
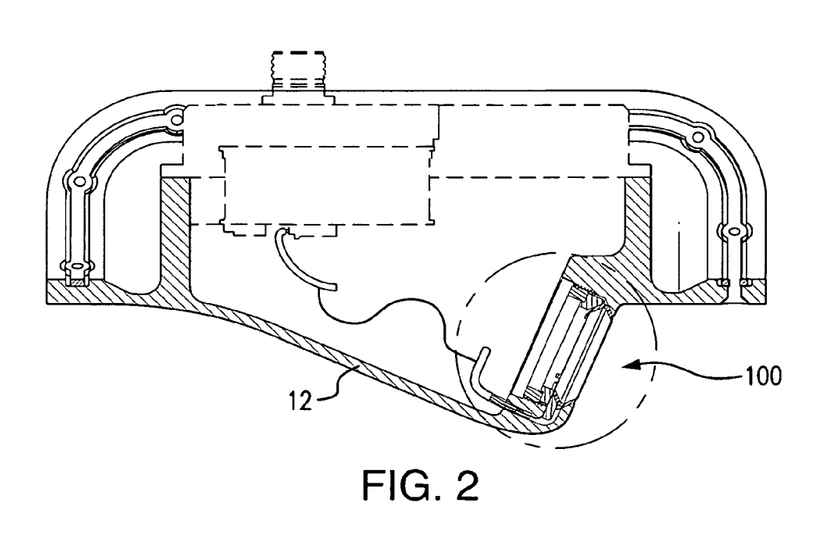
FIG. 2 is a cross-sectional view of the exterior camera pod shown in FIG. 1.

Referring now to FIG. 2, the compression mounted window assembly 100 of the subject invention is mounted in such a manner so that the exterior surface of the window is substantially flush with the exterior surfaces of the camera housing 12. In this way, the window assembly 100 does not impact the air stream flowing over the surfaces of the camera housing 12 while the aircraft 10 is in flight. Consequently, the compression mounted window assembly 100 of the subject invention does not create unnecessary drag.

Figure 3:
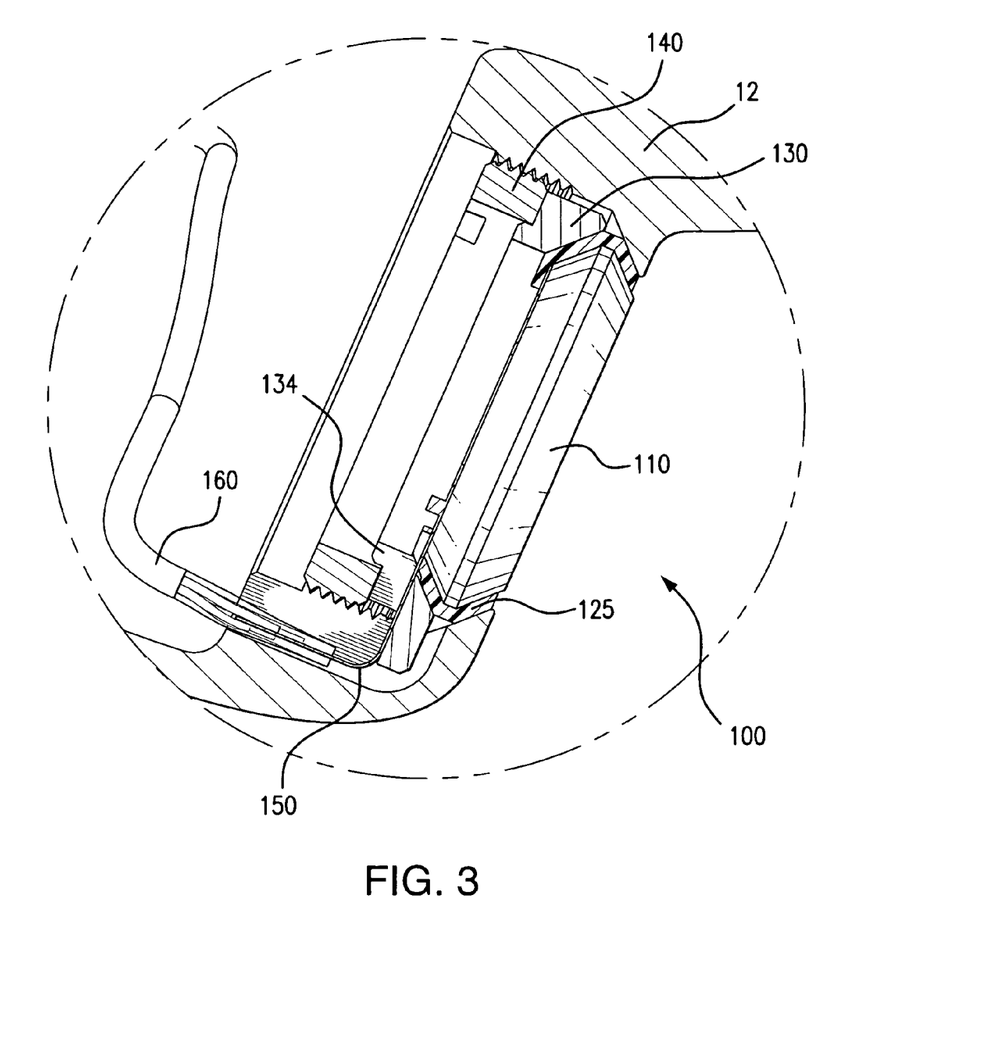
FIG. 3 is an enlarged localized view of the compression mounted window assembly shown in FIG. 2 mounted within the camera pod housing.
Figure 4:
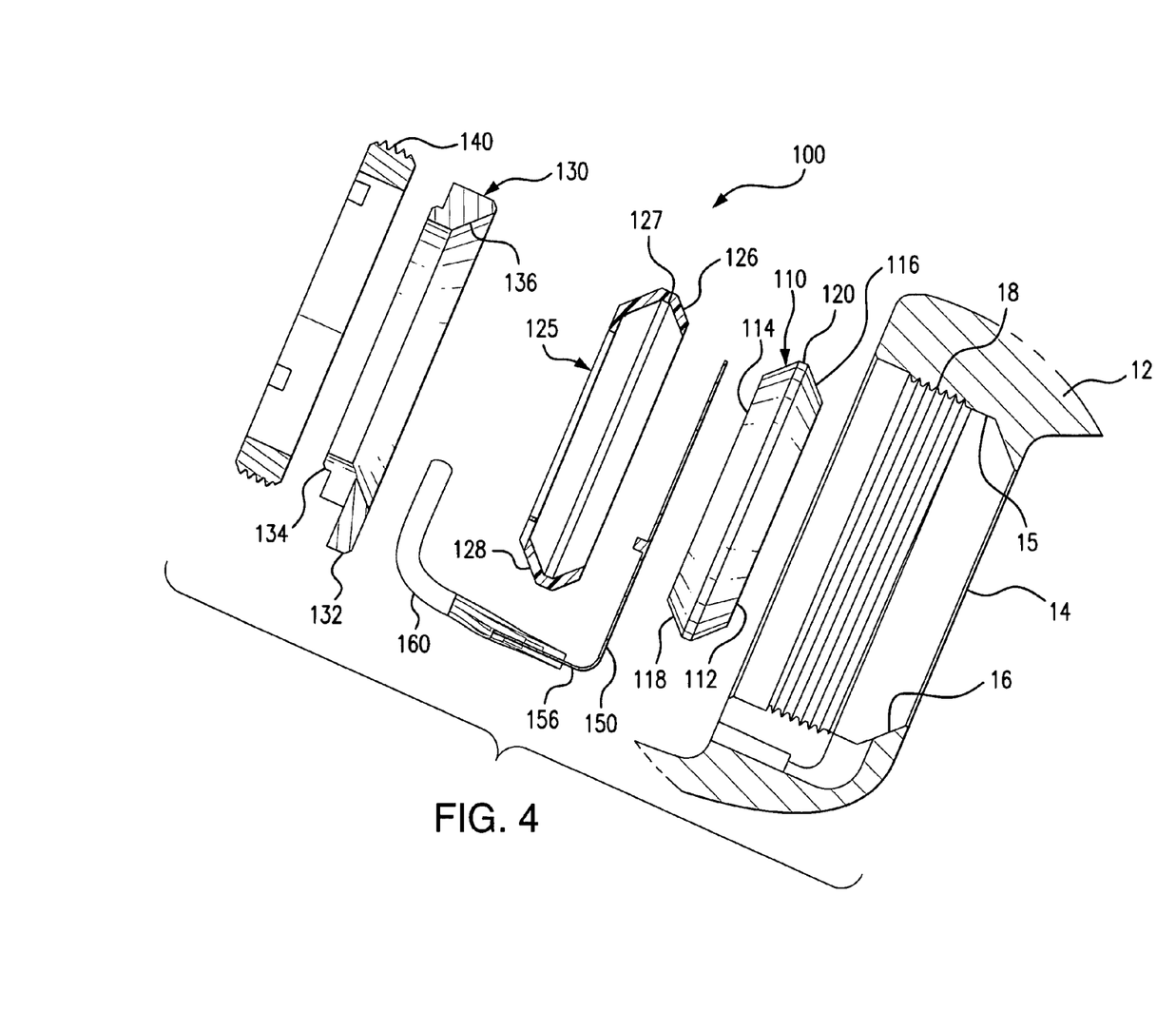
FIG. 4 is an exploded side elevational view of the compression mounted window assembly shown in FIG. 2, with each of the component parts shown in cross-section, with the exception of the window itself.
Figure 5:
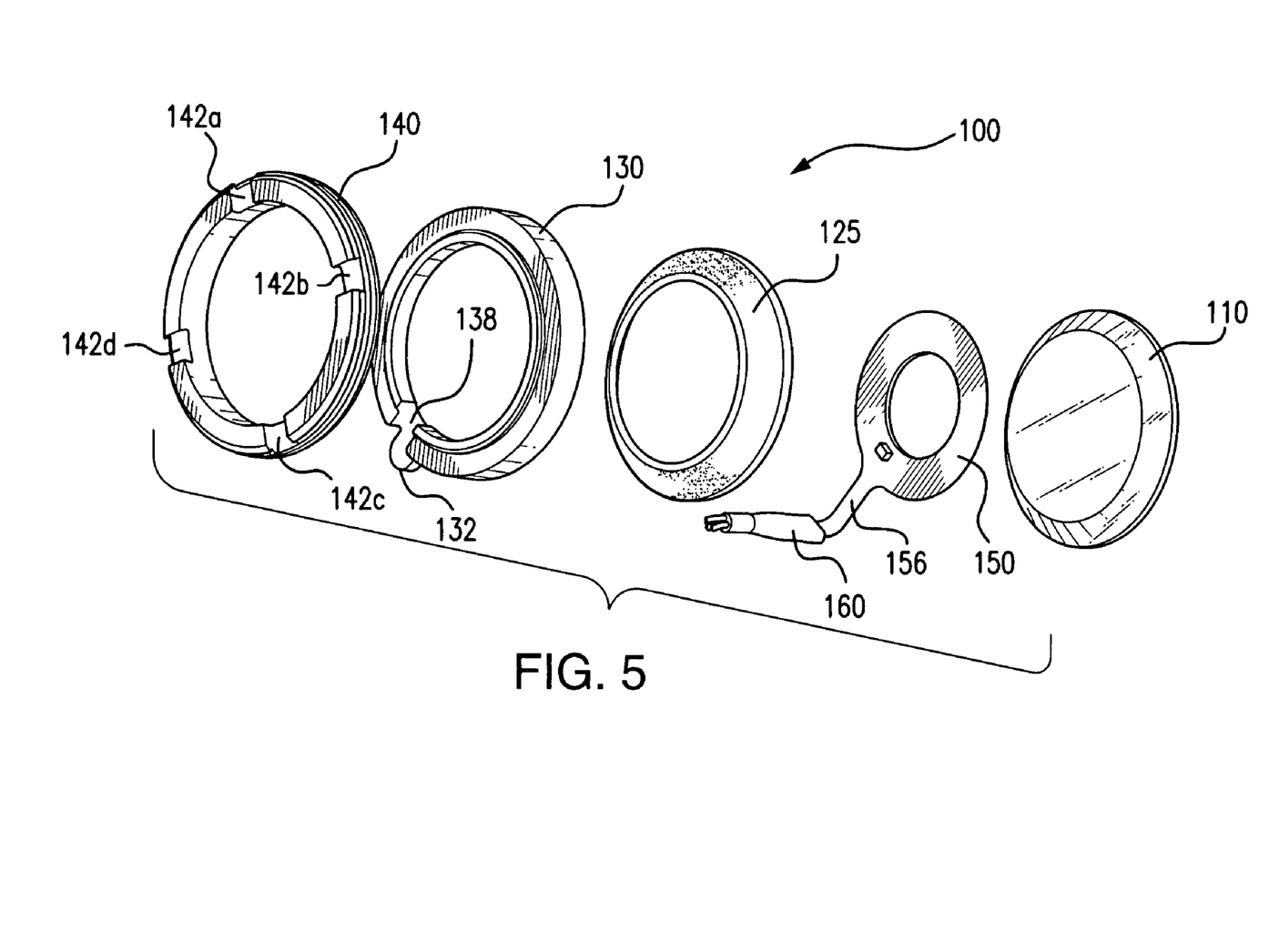
FIG. 5 is an exploded perspective view of the window assembly of the subject invention.

Referring now to FIGS. 3 through 5, the compression mounted window assembly 100 is positioned within a circular portal 14 formed in the camera housing 12. The portal 14 of housing 12 defines an annular seat 15 having a chamfered abutment surface 16 and an internally threaded region 18.

Figure 6A:
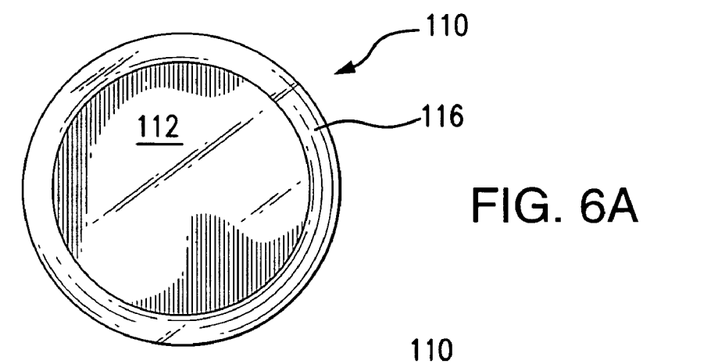
FIG. 6A is a top plan view of the sapphire window of the window assembly.
Figure 6B:
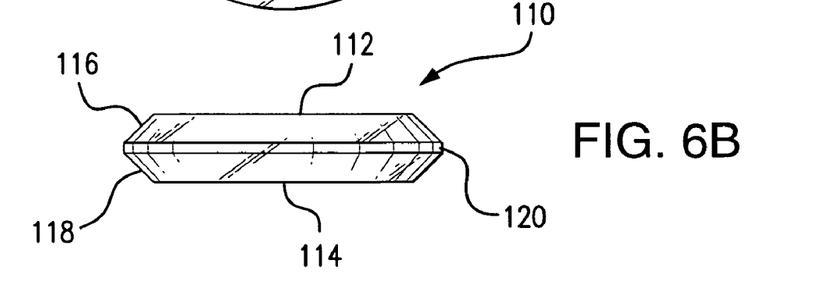
FIG. 6B is a side elevational view of the sapphire window of the window assembly.

The window assembly 100 includes a clear, single crystal sapphire ($Al_2O_3$) window 110 which is both heat and impact resistant. Moreover, the window 110 is configured to withstand high speed ballistic impacts with ice, hail and gravel, while the aircraft in-flight, during take-off and landing and while taxiing. As best seen in FIGS. 6A and 6B, window 110 is a circular component having front and rear planar surfaces 112 and 114. Window 110 has an outer periphery defined by a forward facing chamfered edge surface 116 extending from the front surface 112, a rearward facing chamfered edge surface 118 extending from the rear surface 114, and a peripheral land area 120 where the edge surfaces 116 and 118 converge. The forward facing edge surface 116 corresponds with the chamfered abutment surface 16 of the annular seat 15 in portal 14.

The forward and rearward facing chamfered edge surfaces 116 and 118 of window 110 define relative angles, which are preferably complementary angles, and in a preferred embodiment, the complementary angles formed by the forward and rearward facing chamfered edge surfaces 116 and 118 are 45° angles. The double chamfer provides compressive radial forces on the window 110, when mounted in the housing 12, which can increase the impact resistance of the window. In addition, the chamfered surfaces 116 and 118 provide a self-centering effect for the window assembly 100.

Referring again to FIGS. 3 through 5, the window assembly 100 further includes a compressible material 125 that is configured to circumscribe the outer periphery of the window 110. Preferably, the compressible material 125 is configured as a molded gasket adapted to fully encompass the edge surfaces 116 and 118, as well as the land area 120 defining the periphery of the window 110. More particularly, compressible gasket 125 includes a forward portion 126 configured to circumscribe the forward facing edge surface 116 of window 110, a midsection 127 configured to circumscribe the peripheral land area 120 and a rearward portion 128 configured to circumscribe the rearward facing edge surface 118.

The gasket 125 is preferably formed from an elastomeric material, such as, for example a fluoroelastomer or fluoropolymer. The material from which the gasket 125 is made preferably has a durometer of between 40 and 80, and more preferably, the durometer of the gasket material is between 55 and 65. It is envisioned that the compressible material could consist of a potting compound or adhesive which is applied to the window 110 so as to circumscribe the entire periphery thereof.

Figures 8A, 8B:
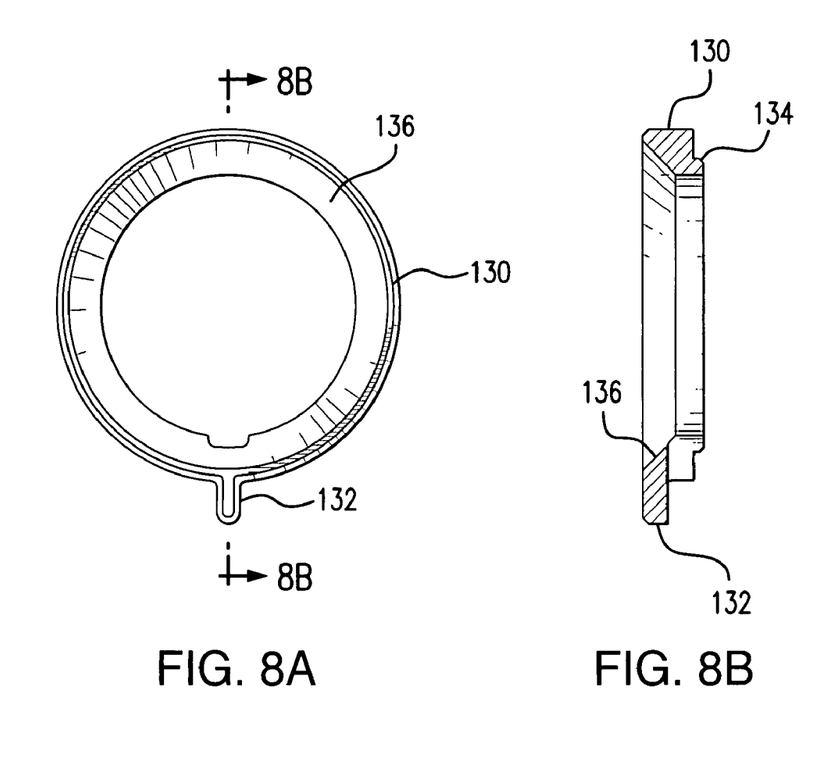
FIG. 8A is a top plan view of the bezel of the window assembly.
FIG. 8B is a cross-sectional view of the bezel taken along line 8B-8B of FIG. 8A.

With continuing reference to FIGS. 3 through 5, window assembly 100 further includes an annular bezel 130 for compressively retaining the window 110 in the seat 15 of the portal 14 of camera housing 12. As best seen in FIG. 8B, the retaining bezel 130 has a chamfered abutment surface 136 that corresponds with the rearward facing chamfered edge surface 116 of the window 110. More particularly, the angle of the chamfered abutment surface 136 of bezel 130 corresponds to the angle of the rearward facing edge surface 118 of window 110. As best seen in FIG. 8A, the retaining bezel 130 preferably includes a radially outwardly extending stem 132 for installing the bezel in the portal and adjusting or otherwise maintaining its position relative to the compressible gasket 125 and window 110 during installation.

Figures 7A, 7B:
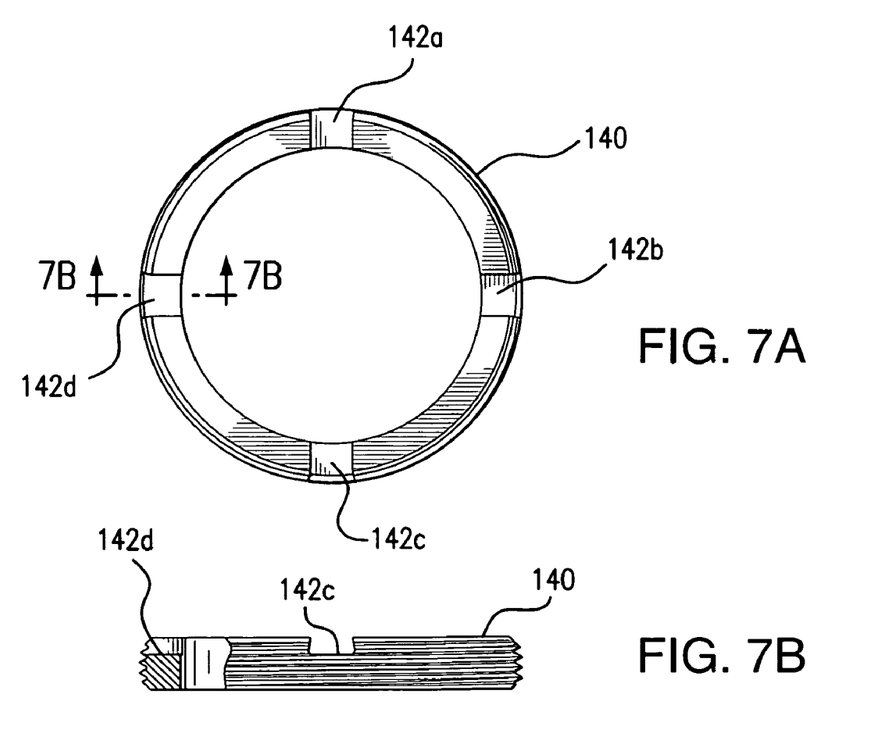
FIG. 7A is a top plan view of the threaded locking ring of the window assembly.
FIG. 7B is a side elevational view of the threaded locking ring of the window assembly, in partial cross-section.

Window assembly further includes a threaded locking ring 140, which is adapted and configured for threaded engagement with the portal 14 of camera housing 12 to compressibly urge the retaining bezel 130 forward against the compressible gasket 125 and window 110. As best seen in FIGS. 5 and 8B, the rearward portion of the bezel 130 includes annular flange 134 that is dimensioned and configured to intimately engage the interior of locking ring 140 during assembly (see FIG. 3). This ensures that the two components (130, 140) are coaxially aligned with one another and centered in the portal 14, so that the locking ring 140 exerts equal compression over the circumference of the bezel 130. As best seen in FIGS. 7A and 7B, the locking ring 140 has a plurality of circumferentially disposed radial slots 142a-142d to accommodate a turning tool (not shown) for readily installing and removing the locking ring 140.

Referring again to FIGS. 3 through 5, window assembly 100 further includes a resistive heating element 150 that is operatively associated with the rear surface 114 of the window 110 for heating the window 110 to prevent condensation and ice accretion. The resistive heating element 150 consists of a foil element 154 applied to the rear surface 114 of the window 110. Those skilled in the art will readily appreciate that the geometry and size of the foil heater can vary depending upon the intended use of the window without departing from the spirit or scope of the subject disclosure. For example, the foil heater can be configured so that it has a circular outer periphery and a rectangular inner periphery.

Figure 8C:
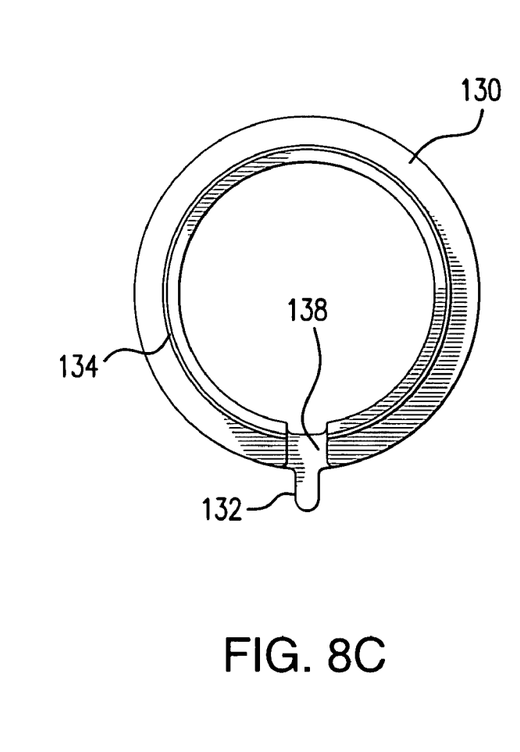
FIG. 8C is a bottom plan view of the bezel of the window assembly.

In an alternative embodiment of the invention, the heating element 150 may be in the form of a conductive film that is applied to the rear surface 114 of the window 110 through conventional sputtering techniques. The foil element 154 includes a connector tab 156 that is adapted and configured to communicate with a wire harness 160, as illustrated in FIG. 4. As best seen in FIGS. 4 and 8C, the bezel 130 has a radial slot 138 for accommodating the connector flange 156 of heating element 150, so that it does not become sandwiched between the bezel 130 and threaded locking ring 140 during assembly.

During the installation of window assembly 100 in the portal 14 of camera housing 12, the gasket 125 is wrapped around the circular window 110. The window 110 is then positioned in the portal 14 of the housing 12. At such a time, the forward portion of the gasket 125 circumscribing the forward facing edge surface 116 of window 110 is in intimate contact with the chamfered abutment surface 16 defined by the seat 15 in the portal 14 of housing 12. Then, the retaining bezel 130 is positioned behind the window 110 so the chamfered abutment surface 136 of bezel 130 is in intimate contact with the rearward portion 128 of the gasket 125. Finally, the locking ring 140 is mated with the rear flange 134 of the bezel 130 as it is threadably engaged in the portal 14. While the locking ring 140 is being threadably engaged, the stem 132 on retaining bezel 130 may be held so as to ensure the relative rotational position of the bezel is maintained within the assembly.

Thereupon, the window 110 is compressed between the chamfered abutment surface 136 of bezel 130 and the chamfered abutment surface 16 of housing portal 14. The act of mounting window 110 in this manner compresses the surrounding gasket 125, which ensures an effective seal against moisture and air, while maintaining thermal isolation of the window 110 from the housing 12. Those skilled in the art will readily appreciate that the compressive forces generated by the chamfered abutment surfaces (16, 136) have directional components in the radial and axial directions relative to the front and rear planar surfaces 112, 114 of window 110. These compressive forces advantageously provide impact strength to the window.

Figure 9:
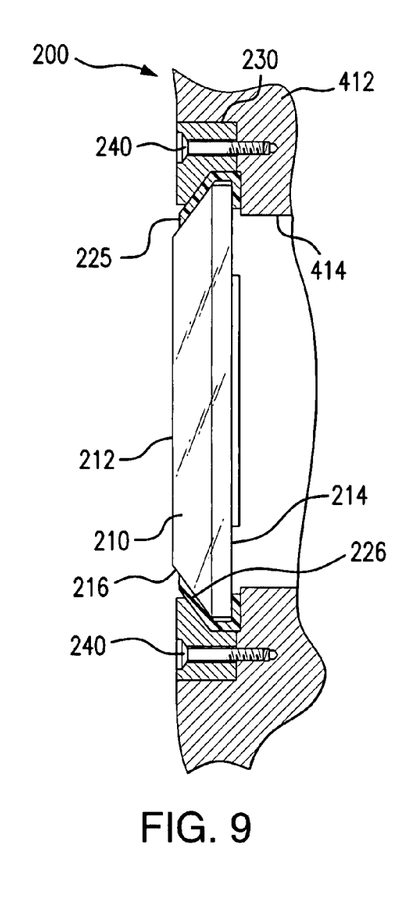
FIG. 9 is a partial cross-sectional view of an another embodiment of the compression mounted window assembly of the subject invention, wherein the window has a single forward facing chamfered surface that corresponds to a chamfered abutment surface of the annular bezel.
Figure 10:
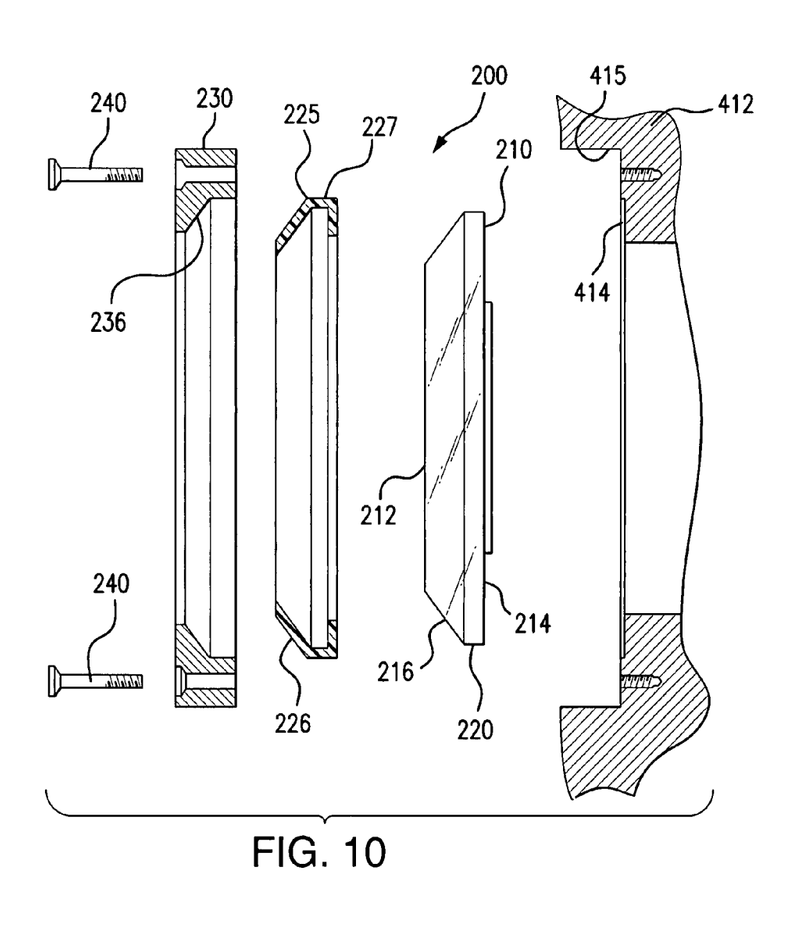
FIG. 10 is a view of the component parts of the compression mounted window assembly shown in FIG. 9, which are separated for ease of illustration.

Referring to FIGS. 9 and 10, there is illustrated another embodiment of the compressible window assembly of the subject invention which is designated generally by reference numeral 200. Window assembly 200 includes a circular window 210 having front and rear planar surfaces 212 and 214. Window 210 also includes an outer periphery defined by a forward facing chamfered edge surface 216 extending from the front surface 212 and a peripheral land area 220 extending from the rear surface 214. A compressible gasket 225 circumscribes the outer periphery of the window 210, and includes a forward portion 226 configured to circumscribe the forward facing edge surface 216 of window 210 and rearward section 227 configured to circumscribe peripheral land area 220.

Window assembly 200 further includes an annular bezel 230 adapted and configured to compressibly retain the window 220 in the circular portal 414 of housing 412. More particularly, the retaining bezel 230 has a chamfered abutment surface 236 that corresponds with the rearward facing chamfered edge surface 216 of window 210. A plurality of threaded fastener 240 are provided for fastening the bezel 230 within a seat 415 formed in the housing 412, and thereby compressibly retain the window 210 in the portal 414.

Figure 11:
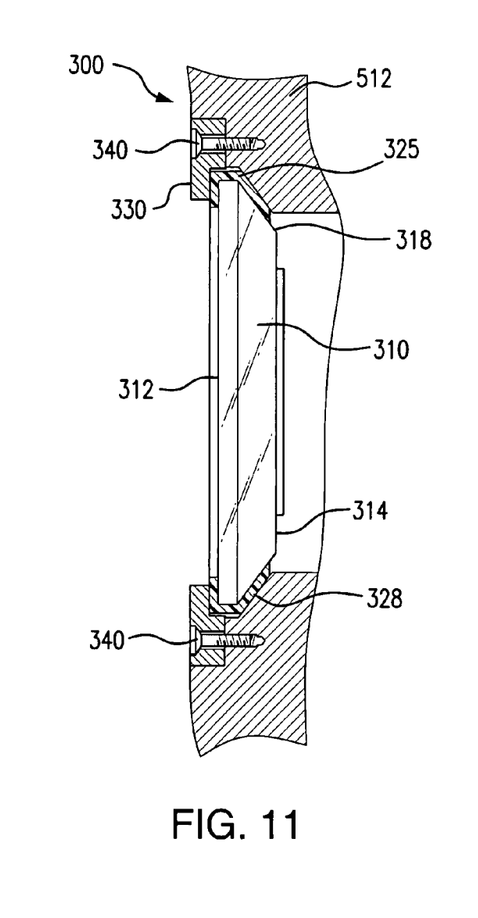
FIG. 11 is a partial cross-sectional view of yet another embodiment of the compression mounted window assembly of the subject invention, wherein the window has a single rearward facing chamfered surface that corresponds to a chamfered abutment surface in the annular seat of the housing.
Figure 12:
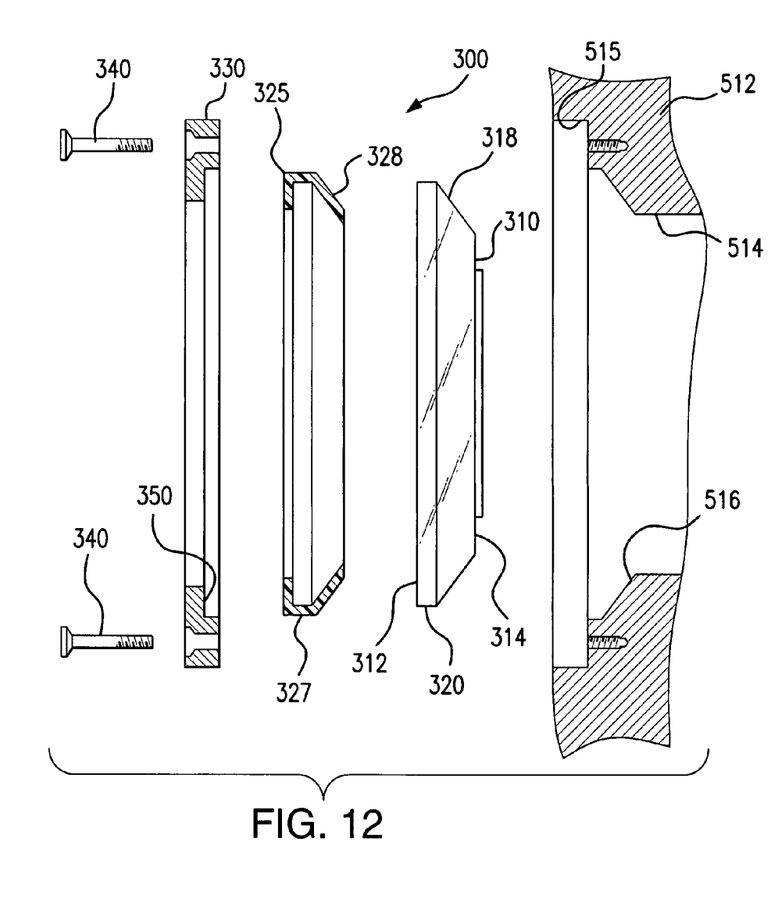
FIG. 12 is a view of the component parts of the compression mounted window assembly shown in FIG. 11, which are separated for ease of illustration.

Referring now to FIGS. 11 and 12, there is illustrated yet another embodiment of the compressible window assembly of the subject invention, which is designated generally by reference numeral 300. Window assembly 300 includes a circular window 310 having front and rear planar surfaces 312 and 314. Window 300 further includes an outer periphery defined by a rearward facing chamfered edge surface 318 extending from the rear surface 314 and a peripheral land area 320 extending from the front surface 312. A compressible gasket 325 circumscribes the outer periphery of the window 310, and includes a rearward portion 328 configured to circumscribe the rearward facing edge surface 318 of window 310 and a forward section 327 configured to circumscribe peripheral land area 320.

In this embodiment of the subject invention, the chamfered edge surface 318 corresponds with a chamfered abutment surface 516 formed in the portal 514 of housing 512. Window assembly 300 further includes an annular bezel 330 adapted and configured to compressibly retain the window 310 in the circular portal 514 of housing 512. Bezel 300 includes an annular seat 350 for accommodating a portion of the peripheral land area 320 circumscribed by the forward section 327 of gasket 325. A plurality of threaded fasteners 340 are provided for fastening the bezel 330 within a seat 515 formed in the housing 512, and thereby compressibly retaining the window 310 in the portal 514.

Figure 13:
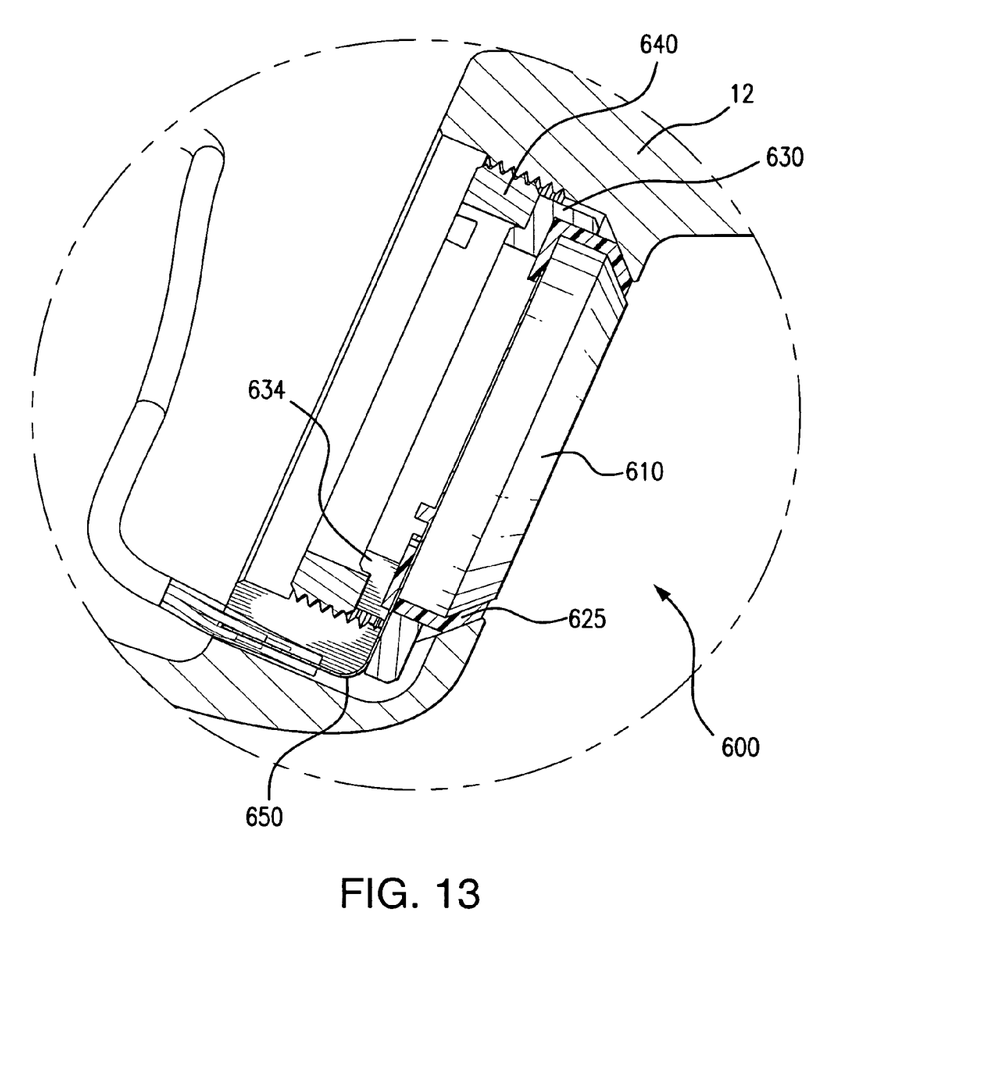
FIG. 13 is an cross-sectional view, similar to FIG. 3, of another embodiment of the compression mounted window assembly of the subject invention, wherein the window has a single forward facing chamfered surface that corresponds to a chamfered abutment surface in the annular seat of the housing and the bezel has a circular seat that corresponds to a rearward facing circular surface of the window.
Figure 14:
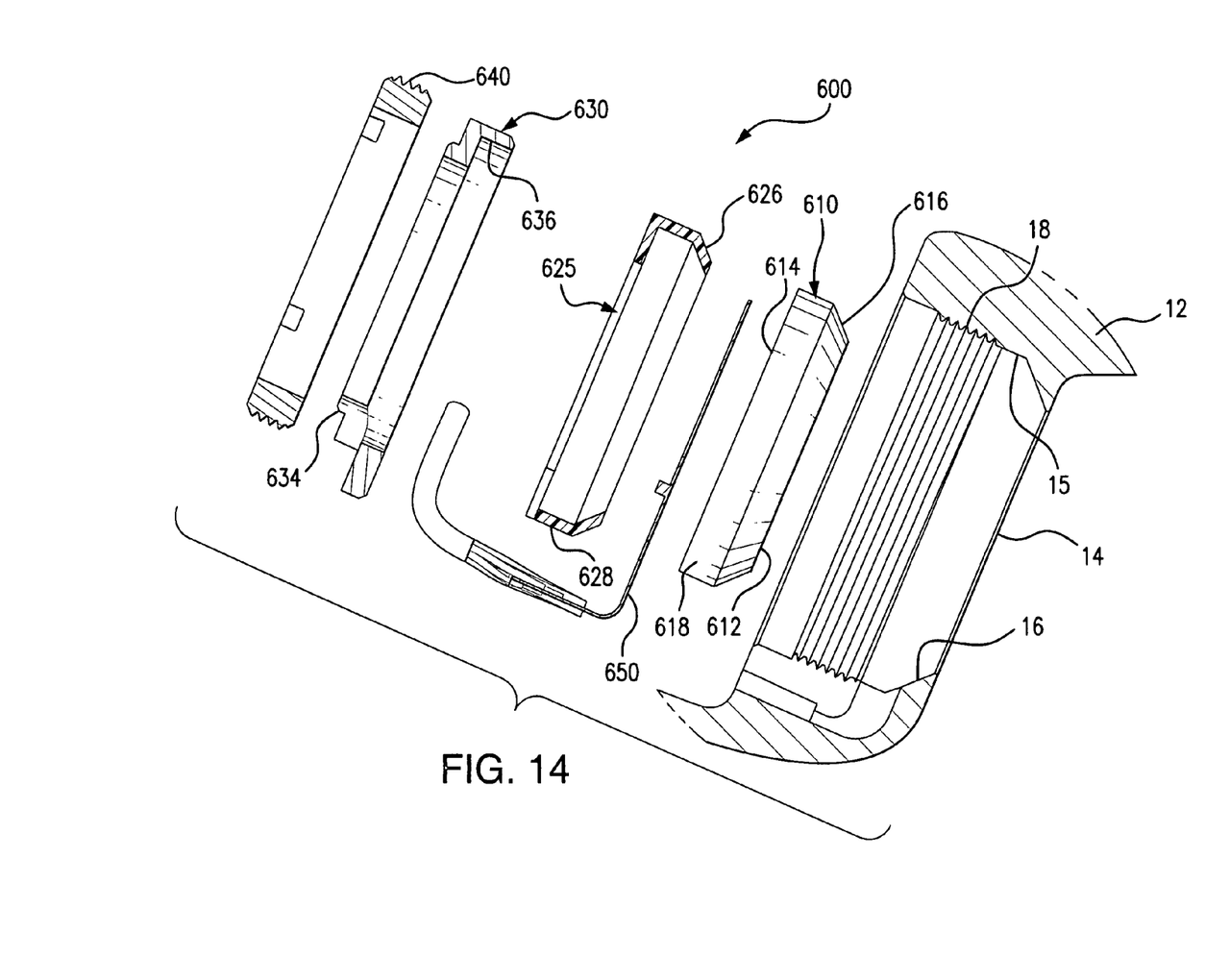
FIG. 14 is an exploded side elevational view of the compression mounted window assembly shown in FIG. 13, with each of the component parts shown in cross-section, with the exception of the window itself.

Referring to FIGS. 13 and 14, there is illustrated still another embodiment of the compression mounted window assembly of the subject invention, which is designated generally by reference numeral 600. Window assembly 600 includes a window 610 having front and rear planar surfaces 612 and 614. Window 610 has an outer periphery defined by a forward facing chamfered edge surface 616 extending from the front surface 612 and a rearward facing circular edge surface 618 extending from the rear surface 614. The forward facing edge surface 616 corresponds with the chamfered abutment surface 16 of the annular seat 15 in portal 14.

Window assembly 600 further includes a compressible gasket 625 that is configured to circumscribe the outer periphery of the window 610. More particularly, compressible gasket 625 includes a forward portion 626 configured to circumscribe the forward facing chamfered edge surface 616 of window 610 and a rearward portion 628 configured to circumscribe the rearward facing circular edge surface 618.

Window assembly 600 also includes an annular bezel 630 for compressively retaining the window 610 in the seat 15 of the portal 14 of housing 12. The bezel 630 has a circular seat 636 that corresponds with the rearward facing circular edge surface 618 of window 610. Window assembly 600 further includes a threaded locking ring 640, which is adapted and configured for threaded engagement with the portal 14 of housing 12 to compressibly urge the retaining bezel 630 forward against the compressible gasket 625 and window 610. As best seen in FIG. 13, the rearward portion of the bezel 630 includes annular flange 634 that is dimensioned and configured to intimately engage the interior of locking ring 640 during assembly. Window assembly 600 also includes a resistive heating element 650 that is operatively associated with the rear surface 614 of window 610 for heating the window 610 to prevent condensation and ice accretion.

Figure 15:
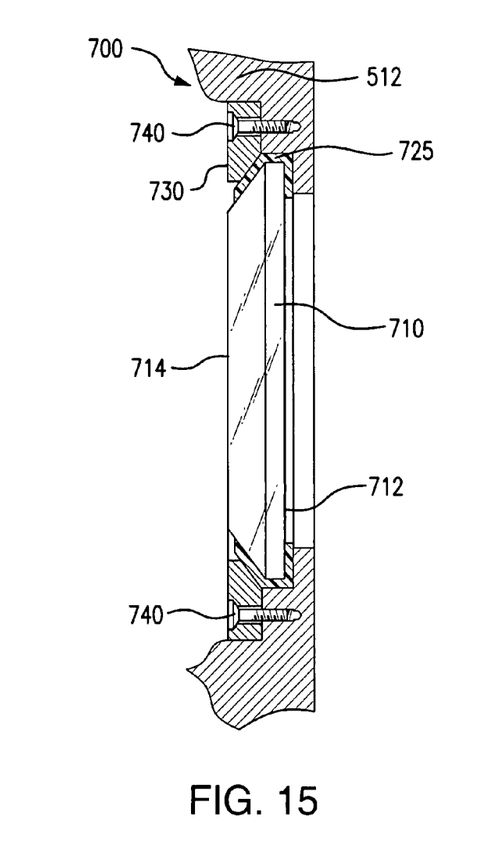
FIG. 15 is a partial cross-sectional view of still another embodiment of the compression mounted window assembly of the subject invention, wherein the window has a single rearward facing chamfered surface that corresponds to a chamfered abutment surface in the annular seat of a bezel.
Figure 16:
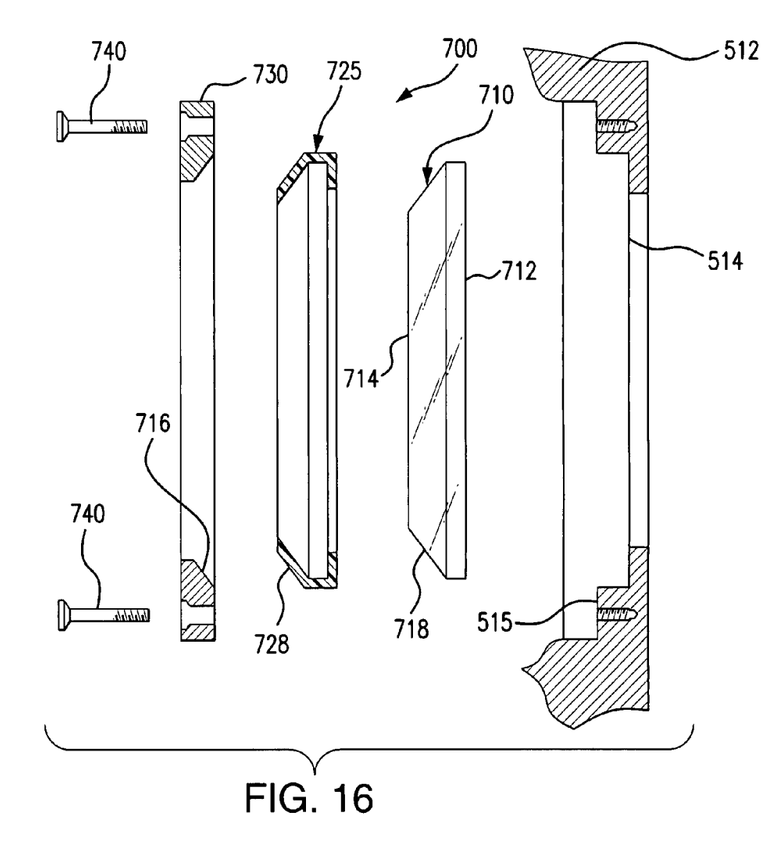
FIG. 16 is a view of the component parts of the compression mounted window assembly shown in FIG. 15, which are separated for ease of illustration.

Referring now to FIGS. 15 and 16, there is illustrated a further embodiment of the compressible window assembly of the subject invention, which is designated generally by reference numeral 700. Window assembly 700 includes a circular window 710 having a front planar surface 712 and a rear planar surface 714. Window 700 further includes an outer periphery defined in part by a rearward facing chamfered edge surface 718 extending from the rear surface 714. A compressible gasket 725 circumscribes the outer periphery of window 710, and it includes a rearward portion 728 configured to circumscribe the rearward facing chamfered edge surface 718 of window 710.

In this embodiment of the subject invention, the chamfered edge surface 718 corresponds with a chamfered abutment surface 716 formed in an annular bezel 730 adapted and configured to compressibly retain window 710 in the circular portal 514 of housing 512. A plurality of threaded fasteners 740 are provided for fastening the bezel 730 within a seat 515 formed in the housing 712, and thereby compressibly retaining the window 710 in the portal 514, as illustrated in FIG. 15.

While the subject invention has been described with respect to preferred and exemplary embodiments, those skilled in the art will readily appreciate that various changes and/or modifications can be made to the invention without departing from the spirit or scope of the invention as described herein.

What is claimed is:

1. A compression mounted window assembly comprising:
a) a circular window having opposed front and rear planar surfaces and an outer periphery having at least one chamfered edge surface;
b) a compressible material circumscribing the outer periphery of the window;
c) a housing having a portal defining an annular seat for accommodating the window circumscribed by the compressible material;
d) an annular bezel operatively associated with the housing for compressively retaining the window assembly within the annular seat of the portal; and
e) means for securing the bezel to the housing;
wherein at least one of the annular seat and the annular bezel has a chamfered abutment surface that cooperates with the at least one chamfered edge surface of the window, wherein the window is configured from sapphire, $Al_2O_3$.

2. A compression mounted window assembly comprising:
a) a circular window having opposed front and rear planar surfaces and an outer periphery having at least one chamfered edge surface;
b) a compressible material circumscribing the outer periphery of the window;
c) a housing having a portal defining an annular seat for accommodating the window circumscribed by the compressible material;
d) an annular bezel operatively associated with the housing for compressively retaining the window assembly within the annular seat of the portal; and
e) means for securing the bezel to the housing;
wherein at least one of the annular seat and the annular bezel has a chamfered abutment surface that cooperates with the at least one chamfered edge surface of the window, wherein the at least one chamfered edge surface extends from the front surface of the window and the annular bezel has a chamfered abutment surface that cooperates with said at least one chamfered edge surface of the window.

3. A compression mounted window assembly as recited in claim 1, wherein the at least one chamfered edge surface extends from the rear surface of the window and the annular seat has a chamfered abutment surface that cooperates with said at least one chamfered edge surface of the window.

4. A compression mounted window assembly as recited in claim 1, wherein the at least one chamfered edge surface extends from the front surface of the window and the annular seat has a chamfered abutment surface that cooperates with said at least one chamfered edge surface of the window.

5. A compression mounted window assembly comprising:
a) a circular window having opposed front and rear planar surfaces and an outer periphery having at least one chamfered edge surface;

b) a compressible material circumscribing the outer periphery of the window;
c) a housing having a portal defining an annular seat for accommodating the window circumscribed by the compressible material;
d) an annular bezel operatively associated with the housing for compressively retaining the window assembly within the annular seat of the portal; and
e) means for securing the bezel to the housing;

wherein at least one of the annular seat and the annular bezel has a chamfered abutment surface that cooperates with the at least one chamfered edge surface of the window, wherein the outer periphery of the window includes a forward facing chamfered edge surface that extends from the front surface of the window and a rearward facing chamfered edge surface that extends from the rear surface of the window, and wherein the annular seat has a first chamfered abutment surface that corresponds with the forward facing chamfered edge surface and the annular bezel has a second chamfered abutment surface that cooperates with the rearward facing chamfered edge surface.

6. A compression mounted window assembly as recited in claim 5, wherein the forward and rearward facing chamfered edge surfaces converge at a peripheral land area.

7. A compression mounted window assembly as recited in claim 6, wherein the forward and rearward facing chamfered edge surfaces define relative angles.

8. A compression mounted window assembly as recited in claim 6, wherein the forward and rearward facing chamfered edge surfaces define complementary angles.

9. A compression mounted window assembly as recited in claim 6, wherein the complementary angles formed by the forward and rearward facing chamfered edge surfaces are 45° angles.

10. A compression mounted window assembly as recited in claim 1, wherein the securing means includes a threaded locking ring for securing the bezel to the housing.

11. A compression mounted window assembly as recited in claim 1, wherein the securing means includes a plurality of threaded fasteners for securing the bezel to the housing.

12. A compression mounted window assembly as recited in claim 1, further comprising means operatively associated with the rear surface of the window for heating the window to prevent icing and condensation.

13. A compression mounted window assembly as recited in claim 12, wherein the heating means includes a foil element applied to the rear surface of the window.

14. A compression mounted window assembly as recited in claim 12, wherein the heating means includes a film applied to the rear surface of the window.

15. A compression mounted window assembly as recited in claim 1, wherein the compressible material is configured from a silicone based elastomer.

16. A compression mounted window assembly comprising:

a) a circular window having opposed front and rear planar surfaces and an outer periphery having forward and rearward facing chamfered edge surfaces;
b) a compressible gasket circumscribing the outer periphery of the window;
c) a housing having a portal defining an annular seat for accommodating the window circumscribed by the gasket, wherein the annular seat has a first chamfered abutment surface corresponding with the forward facing chamfered edge surface of the window;
d) an annular bezel operatively associated with the housing for compressively mounting the window assembly within the annular seat of the portal, wherein the bezel has a second chamfered abutment surface corresponding with the rearward facing chamfered edge surface of the window; and
e) a means for securing the bezel to the housing.

17. A compression mounted window assembly as recited in claim 16, further comprising means operatively associated with the rear surface of the window for heating the window to prevent icing and condensation.

18. A method of compressively mounting a window assembly in a housing having a portal defining an annular seat, comprising the steps of:
a) providing a circular window having front and rear planar surfaces and an outer periphery having forward and rearward facing chamfered edge surfaces;
b) circumscribing the outer periphery of the window with a compressible gasket;
c) seating the window, circumscribed by the compressible gasket, in the portal; and
d) compressively retaining the window in the annular seat of the portal.

19. A method according to claim 18, wherein the step of compressively retaining the window in the annular seat includes applying compression in radial and axial directions relative to the front and rear planar surfaces of the window.

20. A compression mounted window assembly comprising:
a) a circular window configured from sapphire and having opposed front and rear planar surfaces and an outer periphery having at least one chamfered edge surface;
b) a compressible material circumscribing the outer periphery of the window;
c) a housing having a portal defining an annular seat for accommodating the window circumscribed by the compressible material;
d) an annular bezel operatively associated with the housing for compressively retaining the window assembly within the annular seat of the portal; and
e) means for securing the bezel to the housing;

wherein at least one of the annular seat and the annular bezel has a chamfered abutment surface that cooperates with the at least one chamfered edge surface of the window.

* * * * *